(12) United States Patent
Boudreau et al.

(10) Patent No.: US 8,918,113 B2
(45) Date of Patent: Dec. 23, 2014

(54) WIRELESS COMMUNICATION NETWORK WITH NOISE METRIC BASED OPTIMIZATION FOR CELLULAR CAPACITY IMPROVEMENT

(75) Inventors: Gary David Boudreau, Kanata (CA); Kontantinos Dimou, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 266 days.

(21) Appl. No.: 13/557,832

(22) Filed: Jul. 25, 2012

(65) Prior Publication Data

US 2014/0031050 A1   Jan. 30, 2014

(51) Int. Cl.
*H04W 72/00* (2009.01)
(52) U.S. Cl.
USPC ........................................ 455/452.1; 370/331
(58) Field of Classification Search
CPC ........................... H04W 72/1231; H04W 16/32
USPC ........................................ 455/452.1; 370/331
See application file for complete search history.

(56) References Cited

U.S. PATENT DOCUMENTS

| | | | |
|---|---|---|---|
| 2011/0176497 A1 | 7/2011 | Gopalakrishnan | |
| 2011/0312319 A1 | 12/2011 | Lindoff et al. | |
| 2012/0077511 A1 | 3/2012 | Shin et al. | |

FOREIGN PATENT DOCUMENTS

| | | |
|---|---|---|
| EP | 2 410 781 A1 | 1/2012 |
| WO | 2012080800 A1 | 6/2012 |

OTHER PUBLICATIONS

Xianzhong Xie et al., "Suppressed Inter-cell Asynchronous Interference by Delay-tolerance SLNR Precoding," Institute of Personal Communication/MII Key Lab on Computer Network and Communication, Chongqing University of Posts and Telecommunications, Chongqing 400065, P.R. China consisting of 6-paegs.

Xiaotian Wang et al., "A Scheduling Scheme Based on the SLNR Criterion," National Mobile Communication Research Lab Southeast University Nanjing, P.R.China, 978-1-4244-3693-4109/ $25.00 © 2009 IEEE consisting of 4-pages.

Xiaotian Wang et al., "A Scheduling Scheme Based on the SLNR Criterion," Proceedings from National Mobile Communication Research Lab, Southeast University, Nanjing, P.R. [Retrieved from the Internet at http://dl.acm.org/citation.cfm?id=1736862. 1736956& coll-DL&dl=GUIDE&CFID=10298] on May 14, 2012.

Pinlian Zheng et al., "Suppressed Inter-cell Asynchronous Interference by Delay-tolerance SLNR Precoding," ICACT'10, IEEE Xplore—Abstract Page [Retrieved from the Internet at http://ieeexplore.ieee.org/xpl/login.jsp?tp=&arnumber=5440385& url=http%3A52F%2Fie on May 14, 2012].

(Continued)

*Primary Examiner* — Charles Shedrick
(74) *Attorney, Agent, or Firm* — Christopher & Weisberg, P.A.

(57) ABSTRACT

A radio resource management, RRM, apparatus for at least one wireless communication network macrocell is provided. The macrocell includes at least a first coverage region and second coverage region. The RRM apparatus includes a processor that is configured to determine at least one scheduling block, SB, for use by at least one user device. The determination of the at least one SB is based at least in part on a first noise metric when the at least one user device is located within the first coverage region. The determination of the at least one SB is based at least in part on a second noise metric different from the first noise metric when the at least one user device is located within the second coverage region.

24 Claims, 10 Drawing Sheets

(56) References Cited

OTHER PUBLICATIONS

Shi_Junfeng_etal_"Limited Feedback Bit Allocation for Cooperative Multi-cell Systems with Multi-user MIMO".p. 1 of 2 12th International Conference on Advanced Communications Technology, pp. 627-632, 2010 (relevant) [Retrieved from the Internet at http://www.chinacommunications.cn:8080/zgtx/EN/abstract/abstract7827.shtml on May 14, 2012].

M. Sadek et al., "Leakage Based Precoding for Multi-User MIMO-OFDM Systems," IEEE Transactions on Wireless Communications, vol. 6(5), May 2007), [Retrieved from the Internet at http://ieeexplore.ieee.org/spl/articleDetails.jsp? reload=true&arnumber=4202177&content . . . Jul. 25, 2012].

TS36.331, E-UTRA Radio Resource Control Protocol Specification, vol. 10(3), [Retrieved from the Internet at http://www.etsi.org/deliver/etsi_ts/136200_136299/136213/10.03.00_60/ts_136213v100300p.on Jul. 25, 2012].

Potevio: "Considerations on CoMP Switching and Scenarios," 3GPP Draft; R1-094806, 3rd Generation Partnership Project (3GPP), Mobile Competence Centre; 650, Route des Lucioles; F-06921 Sophia-Antipolis Cedex; France, No. Jeju; Nov. 9, 2009, Nov. 9, 2009 (Nov. 9, 2009), XP050389202, [retrieved on Nov. 5, 2009] p. 1, paragraph 2.1-2.2; p. 3, paragraph 3-p. 4, paragraph 4, consisting of 4-paegs.

International Search Report and Written Opinion dated Nov. 20, 2013 for International Application No. PCT/IB2013/055296, International Filing Date: Jun. 27, 2013 consisting of 14-pages.

International Preliminary Report on Patentability dated Jul. 29, 2014 for International Application No. PCT/IB2013/055296, International Filing Date: Jun. 27, 2013 consisting of 29-pages.

WIRELESS COMMUNICATION NETWORK WITH NOISE METRIC BASED OPTIMIZATION FOR CELLULAR CAPACITY IMPROVEMENT

TECHNICAL FIELD

The present invention relates to wireless communications, and in particular to wireless communication network cellular capacity improvement.

BACKGROUND

The use of wireless communication devices has continued to grow at a steady rate. As the use of wireless communication devices has grown, so has the demand for higher data rates. In order to keep up with the demand for higher data rates and growing demand for wireless communication service in general, service providers have been evolving their existing cellular networks to accommodate higher data rate services and applications.

Several approaches have been implemented to increase the data rates. One approach includes increasing the density of existing macro base stations, i.e., adding more macro base stations. Another approach involves increasing the cooperation between macro base stations. However, building a denser macro base station grid, while also enhancing cooperation between macro base stations is not a cost effective option as new macro base stations have to be installed in which the cost of installation and backhaul network requirements can be substantial.

Also, installing new macro base stations is not time efficient as new installations often take months to deploy. In urban areas, the cost and delay of installing new macro base stations may substantially outweigh the benefits of the installation. For example, a new macro base station may increase data throughput but the user will not get to experience this increased data throughput for the several months it takes to install the macro base station. Moreover, the installation may be specifically designed to service a wireless hotspot in which the wireless hotspot may move or shift by the time the installation is complete, thereby attenuating the benefits of the new installation. The effect of a denser macro station grid also leads to a significantly higher amount of signaling due to frequency of handovers for mobile devices moving at high speeds.

Another approach, involves deployment of smaller base stations within the macro base station grid. This approach is often referred to as a heterogeneous or homogeneous deployment in which the smaller base stations form the "micro" or "pico" layer. In particular, the smaller base stations are lower power nodes that absorb as many users as possible from the macro layers such as to offload the macro layer. The off loading of users from the macro layer allows for higher data rates in both the macro and pico layers. Also, this approach can serve users moving at high speed and can provide higher data rates to users in areas having a higher density of users such as a hotspot.

However, the deployment of lower power base stations or picocells is not without limits. For example, as loading of the network increases, the capacity of the network becomes interference limited, particularly for mobile device users near the cell edge between different cells. Optimizing signal quality for mobile device users, particularly at cell edge regions within a given cell while not overly penalizing neighboring cells is a major obstacle for both heterogeneous and homogenous deployments.

One solution for optimizing signal quality is for each cell to employ a greedy algorithm in which each cell tries to schedule as many of its users as possible in order to maximize its own aggregate throughput. However, if each cell employs this strategy, particularly for a heavily loaded network, this approach quickly leads to an interference limited scenario in which all cells and users suffer degraded performance, i.e., each cell maximizes its own aggregate throughput without considering the impact on neighbor cells.

In order to address the issues of employing a greedy algorithm methodology, a number of intercell interference coordination approaches have been defined including coordinated scheduling, coordinated beamforming, coordinated multipoint (CoMP) and joint processing between nodes. Typically these approaches are coupled with interference rejection approaches such as interference rejection combining (IRC) or serial interference cancellation (SIC), thereby allowing gains in throughput to be achieved.

However, intercell interference coordination coupled with interference rejection usually employs a metric that seeks to maximize some form of signal to interference plus noise ratio (SINR) of all users without considering the spatial and frequency orthogonality of the potential interference signals and the users that are being interfered with. In particular, optimization of SINR such as in IRC and SIC algorithms is based on the received interference at the cell of the user whose signal is being optimized and does not account for the impacts the optimization will have in causing interference in neighboring cells.

SUMMARY

The present invention advantageously provides a method, apparatus and system for cell capacity improvement.

According to one embodiment, a radio resource management, RRM, apparatus for at least one wireless communication network macrocell is provided. The macrocell includes at least a first coverage region and second coverage region. The RRM apparatus includes a processor that is configured to determine at least one scheduling block, SB, for use by at least one user device. The determination of the at least one SB is based at least in part on a first noise metric when the at least one user device is located within the first coverage region. The determination of the at least one SB is based at least in part on a second noise metric different from the first noise metric when the at least one user device is located within the second coverage region.

According to another embodiment, a radio resource management, RRM, method for at least one wireless communication network macrocell is provided. The macrocell includes at least a first coverage region and second coverage region. At least one scheduling block, SB, for use by at least one user device is determined. The determination of the at least one SB is based at least in part on a first noise metric when the at least one user device is located within the first coverage region. The determination of the at least one SB is based at least in part on a second noise metric different from the first noise metric when the at least one user device is located within the second coverage region.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
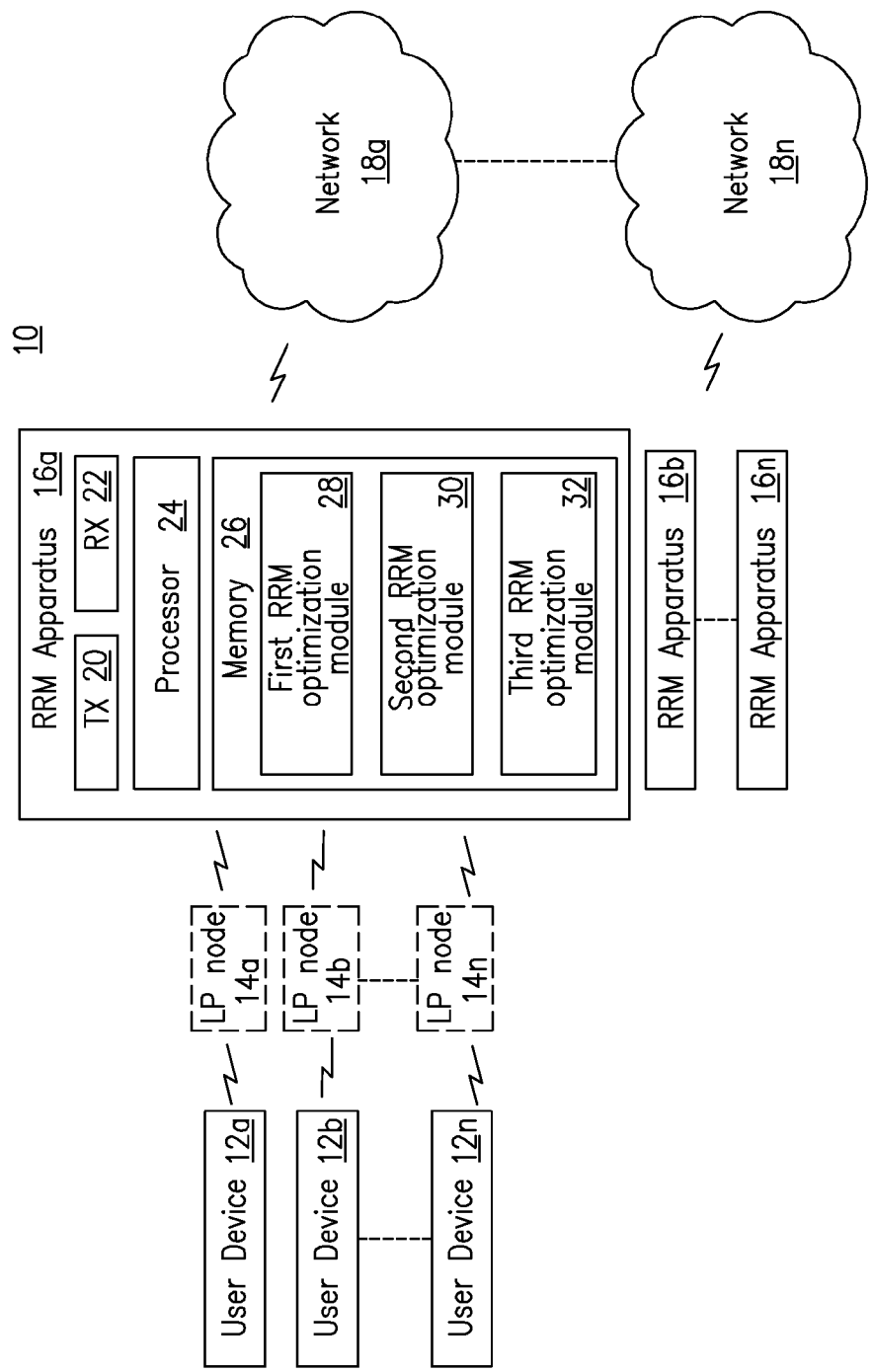
FIG. 1 is a block diagram of an exemplary communication system having radio resource management optimization constructed in accordance with the principles of the present invention.

The present invention advantageously provides an apparatus, system and method for cell capacity improvements. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description.

Referring now to the drawing figures in which like reference designators refer to like elements there is shown in FIG. 1 an exemplary communication system having radio resource management ("RRM") optimization constructed in accordance with the principles of the present invention and designated generally as "10." System 10 may include one or more user devices 12a to 12n (collectively referred to as "device 12"), one or more low power ("LP") wireless communication nodes 14a to 14n (collectively referred to as "LP node 14"), radio resource management apparatuses 16a to 16n (collectively referred to as "RRM apparatus 16") and one or more networks 18a to 18n (collectively referred to as "network 18").

Device 12 may include a transmitter and receiver (not shown) for communicating at least with LP node 14, RRM apparatus 16 and/or other user devices via a communications network. Device 12 may use communication protocols known in the art such as Internet Protocols along with Long Term Evolution (LTE) standards. The communications network may be a wireless communications network. Device 12 may be a terminal or mobile device, among other LTE enabled device. LP node 14 may include a transmitter and receiver (not shown) for communicating at least with device 12 and/or RRM apparatus 16, among other devices and apparatuses. An example of an LP node 14 is a wireless communication node arranged to form a picocell in a heterogeneous or homogenous deployment. Alternatively, LP node 14 may not be included in system 10, e.g., system 10 may not employ picocells and/or femtocells.

RRM apparatus 16 may include transmitter 20 and receiver 22 for communicating with device 12, LP node 14, other RRM apparatuses 16 and network 18 via communication protocols known in the art, e.g., using Internet protocols along with LTE standards. RRM apparatus 16 may include processor 24 such as central processing unit (CPU) for performing apparatus functions described herein. RRM apparatus 16 may be a base station such as an LTE eNodeB that forms one or more macrocell coverage regions or areas.

RRM apparatus 16 may include memory 26 that stores first RRM optimization module 28, second RRM optimization module 30 and/or third RRM optimization module 32, among other modules. In particular, memory 26 may include non-volatile and volatile memory. For example, non-volatile memory may include a hard drive, flash memory, memory stick and the like. Also, volatile memory may include random access memory and others known in the art. Memory 26 may store program instructions such as those for first RRM optimization module 28. For example, first RRM optimization module 28 includes instructions, which when executed by processor 24, cause processor 24 to perform the first RRM optimization process, discussed in detail with respect to FIGS. 2 and 8.

Memory 26 may store program instructions such as those for second RRM optimization module 30. For example, second RRM optimization module 30 includes instructions, which when executed by processor 24, cause processor 24 to perform the second RRM optimization process, discussed in detail with respect to FIGS. 4, 5 and 9. Memory 26 may store program instructions such as those for third RRM optimization module 32. For example, third RRM optimization module 32 includes instructions, which when executed by processor 24, cause processor 24 to perform the third RRM optimization discussed in detail with respect to FIGS. 7 and 8. In general, for devices 12 located within a region or "geometry" where reported transmissions are likely to generate considerable other cell interference, RRM apparatus 16 maximizes a second noise metric, i.e., SLNR, while the first noise metric, i.e., SINR is optimized, for the rest of the regions. At least one scheduling block (SB) is allocated to respective device 12 based at least in part on the first and/or second noise metrics such that signal strength of the respective device 12 is maximized. A scheduling block may correspond to a transmission resource of 180 kHz in the frequency domain. The location of device 12 refers to the electronic location or geometry as measured using a noise metric, e.g., SINR, which defines the region within macrocell 34 that device 12 is in. For example, the electronic location may be based at least in part on the SINR metric being above or below a threshold.

Network 18 may include communications networks such as an Internet Protocol based core network, wide area network, local area network, among other networks known in the art. For example, the IP based core network may be an evolved packet core (EPC) network that is based on end-to-end IP based transmission in and out of the EPC network to/from other networks 18 and RRM apparatus 16. The EPC network may include one or more serving gateways, packet data network gateways and mobile management entities, among other logical entities as is known in the art. Network 18 may provide various voice and data related services, content and the like to device 12.

Figure 2:
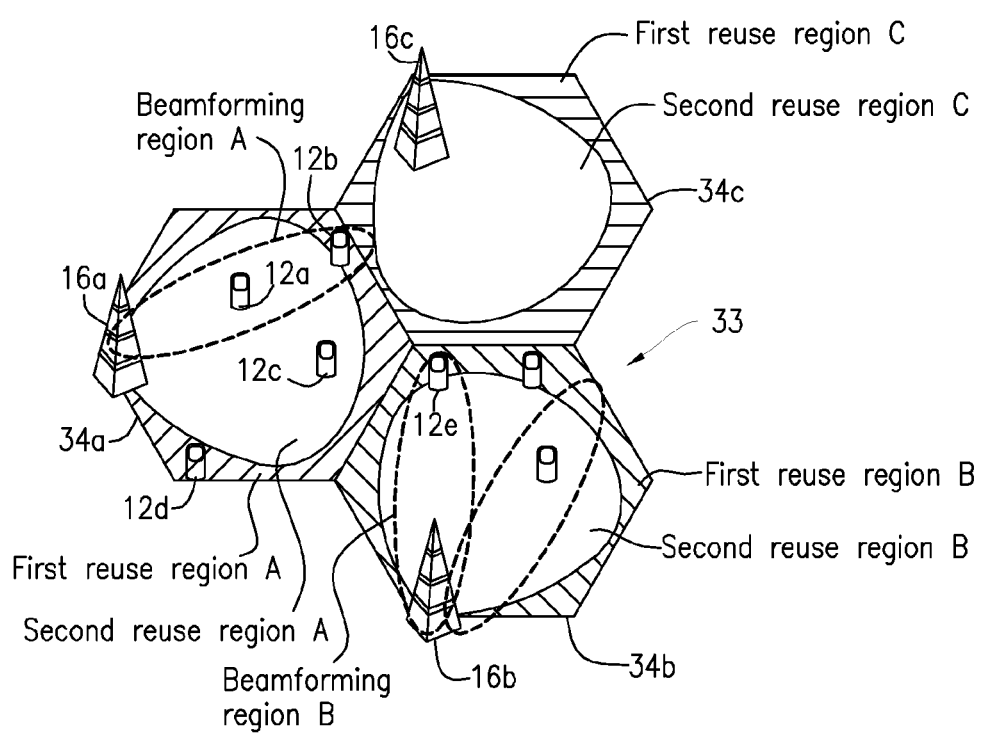
FIG. 2 is a block diagram of a communication system employing a first radio resource management optimization process constructed in accordance with the principles of the present invention.

An exemplary macrocell grid is described with reference to FIG. 2. Macrocell grid 33 may include one or more macrocells such as macrocells 34a to 34c. While three macrocells 34 are illustrated in FIG. 2, one of ordinary skill in the art will recognize that macrocell grid 33 may include less or more than three macrocells 34. Each macrocell 34 may be formed by a respective RRM apparatus 16 such as an LTE eNodeB. For example, macrocell 34a may have a respective coverage area created by RRM apparatus 16a. Alternatively, one or more macrocells 34 may be formed by an eNodeB in which the eNodeB provides radio-related functionality in a plurality of macrocells 34. For example, in a three-sector macrocell grid 33, eNodeB provides the coverage area for three macrocells 34 and handles the transmissions of the three macrocells 34.

Macrocell 34 may implement one or more resource allocation schemes in which the scheme includes at least first and second reuse regions, among other regions. The reuse regions may include a fractional frequency reuse (FFR) region and common frequency reuse region, which help mitigate intercell interference. Other reuse regions may be incorporated as are known in the art. Macrocell 34a may have a first reuse region, second reuse region and optional beamforming region in which one or more noise metrics are applied within respective regions. For example, in macrocell 34a, the first reuse region A is a FFR region and the second reuse region A is a common reuse region in which user devices within the common frequency reuse region are scheduled resources based at least in part on the common reuse scheme while user devices within the FFR region A are allocated resources based at least in part on the FFR scheme. FFR regions such as first reuse regions A, B and C are illustrated using diagonal and horizontal hatching.

Moreover, a first noise metric may be applied in the first reuse region that uses spatial geometry to orthogonalize interference between device 12 in different macrocells 34, i.e., resources in the FFR region are scheduled to device 12 based at least in part on the first noise metric. The second noise metric may be applied in the second reuse region to minimize leakage to neighboring macrocells, e.g., determining at least one resource or SB for use by device 12 in second reuse region A by using the second noise metric may help minimize signal leakage to neighboring macrocells 34b and 34c.

The first noise metric may be an SINR metric and the second noise metric may be an SLNR metric. In particular, the SINR metric may be applied in fractional frequency reuse regions that use spatial geometry to orthogonalize interference between one or more devices 12 in different macrocells 34, i.e., determining at least one SB for device 12 in the FFR regions is based at least in part on the SINR metric. The SLNR metric may be employed in the common reuse region to minimize leakage to neighboring macrocells, i.e., determining at least one SB for device 12 in the common reuse region is based at least in part on SLNR. The SLNR metric may be based on the ratio of desired signal strength at the receiver divided by the total interference leakage power from the transmitter to other devices 12 or RRM apparatuses 16 in the network.

Figure 3:
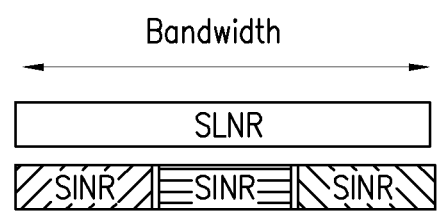
FIG. 3 is a diagram of noise metric to bandwidth mapping of the communication system illustrated in FIG. 2.

The first and second noise metrics take into account one or more portions of the bandwidth of system 10 based at least in part on the resource scheme. For example, RRM apparatus 16 may be configured to employ the first noise metric, i.e., SINR metric, in the first reuse region in which the first noise metric takes into account a portion of the bandwidth or the bandwidth allocated for fractional frequency reuse in the respective macrocell 34, i.e., macrocells 34a, 34b and 34c may be allocated different portions of the bandwidth in respective FFR regions. RRM apparatus 16 may also be configured to employ the second noise metric, i.e., SLNR, for the second reuse region in which the second noise metric takes into account the bandwidth of the macrocell 34. The second noise metric may take into account the bandwidth allocated in the common frequency reuse region in macrocell 34. The noise metric to bandwidth mapping of the FIG. 2 deployment is illustrated in FIG. 3 in which like hatchings illustrate the region/geometry to bandwidth mappings, and the corresponding noise metric is also illustrated.

In LTE, measurement of leakage power for the SLNR calculation may be achieved on the uplink through use of overload indicators (OIs) from adjacent macrocells 34. For downlink implementations in LTE, measurement of leakage power for the SLNR calculation can be achieved by use of reports conveyed in measurement reporting messages from devices 12 in neighboring macrocells 34 that are entering a handover condition. The messaging reports may include A3 reports triggered when the measured signal characteristics of neighboring cell signals become better than the measured signal characteristics of serving cell signals, and/or or A4 reports triggered when the measured signal characteristics of neighboring cell signals are greater than a threshold. The SLNR may be calculated at discussed in M. Sadek, A. Tarighat, A. Sayed, "Leakage Based Precoding or Multi-User MIMO-OFDM Systems", IEEE Transactions on Wireless Communications, vol. 6, no. 5, May 2007, the entirety of which is incorporated by reference.

Moreover, macrocell 34 may optionally employ targeted beamforming to generate at least one beamforming region. The use of beamforming may enhance coverage or signal strength for device 12 in macrocell 34. The signal strength of device 12 within the beamforming region may be optimized by determining at least one scheduling block (SB) for use by device 12 using both the first and second noise metrics. In particular, the signal strength of device 12 within the beamforming region is optimized using the first metric with respect to all devices 12 in spatially orthogonal neighboring macrocell 34. For example, with respect to beamforming region A, the respective signal strengths of devices 12a and 12b are optimized by scheduling at least one respective SB to these devices based at least in part by employing the SINR metric with respect to all devices 12 in macrocell 34b, since beamforming region A is spatially orthogonal to macrocell 34b. Continuing the example, with respect to beamforming region A, the signal strength of devices 12a and 12b are optimized by scheduling at least one respective SB to these devices 12 based at least in part by employing the SLNR metric with respect to all devices 12 in macrocell 34c, since beamforming region A may leak into both FFR region C and common reuse region C, i.e., at least one SB is determined for use by device 12a based at least in part on the SINR and SLNR metrics.

The signal strength of device 12 outside beamforming region A but within macrocell 34a may be optimized according to the first or second metric depending on the location of device 12 within macrocell 34a. For example, the signal strength of device 12c located within the common reuse region A of macrocell 34a may be optimized using the SLNR metric such that interference to/from device 12c and other devices 12 in a different macrocell 34 is optimized. For transmissions within the same macrocell 34, the interference may be mitigated by allocating or scheduling devices on orthogonal resources. Moreover, the signal strength of device 12d outside beam coverage region B but within FFR region A may be optimized using the SINR metric, i.e., devices 12 located outside beam coverage region B but within FFR region are allocated respective resources or SBs based at least in part on the SINR metric.

Referring to macrocell 34b, the signal strength of device 12e, located within macrocell 34b and beamforming region B, may be optimized using at least the first and second noise metrics. For example, with respect to beamforming region B, the signal strength of device 12e is optimized employing the first noise metric with respect to all devices 12 within macrocell 34a, since beamforming region B is spatially orthogonal to macrocell 34a. Continuing the example, the signal strength of device 12e is also optimized employing the second noise metric with respect to all devices 12 in macrocell 34c. Devices 12 located within beamforming region B are scheduled at least one respective SB based at least in part on the SINR and SLNR metrics. The application of at least the first and/or second noise metrics within respective regions is also described in detail with respect to FIG. 8.

Moreover, null steering can also be employed toward the SLNR region. In particular, SLNR may be estimated in the given region employing beam-forming on the basis of a null beam steered towards the affected neighbor cell. Alternatively, if the mapping between SLNR and null beam estimation is not possible, then the null beam area steered toward the affected neighbor macrocell 34 can be used as an additional metric for optimizing the signal strength of devices 12, i.e., at least one SB may be scheduled to device 12 based at least in part on the additional metric.

An exemplary noise metric to bandwidth mapping is illustrated in FIG. 3. In particular, the deployment of FIG. 2 may employ a SINR metric in fractional frequency reuse regions in which respective portions of the bandwidth are allocated for use in respective fractional frequency reuse regions as illustrated using like horizontal and diagonal hatching. Also, the deployment of FIG. 2 may employ an SLNR metric in a common reuse region in which the entire bandwidth is allocated for use within the common reuse region.

Figure 4:
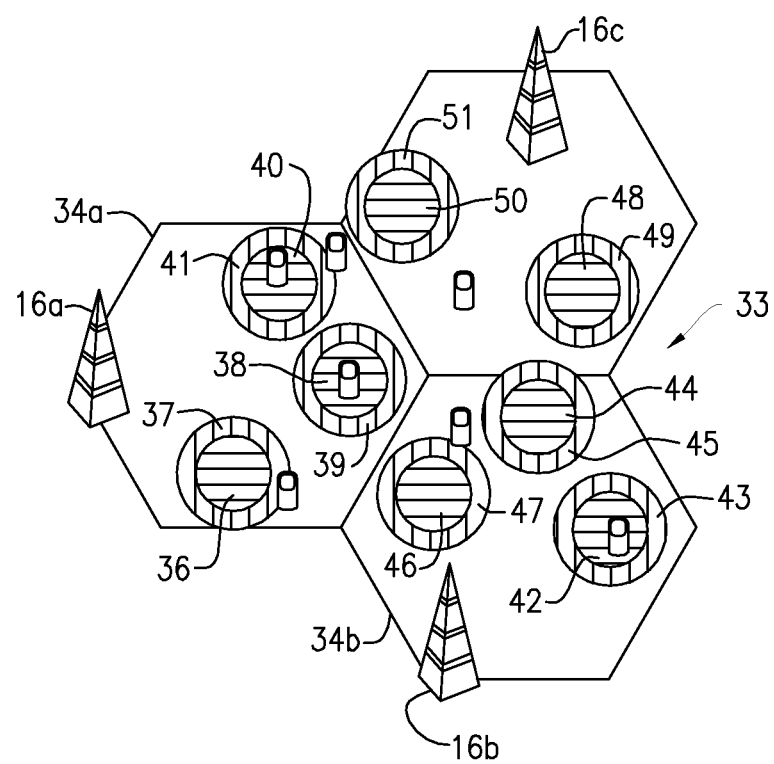
FIG. 4 is a block diagram of a communication system employing a second radio resource management optimization process constructed in accordance with the principles of the present invention.

Another exemplary macro cell grid is illustrated in FIG. 4. Macrocell cell grid 33 may be a heterogeneous deployment in which the picocells have separate physical cell identities (PCIs) from the macrocell in the same coverage region. For example, picocell 36 may have a different PCI than RRM apparatus 16a. The macrocell 34 may have at least one picocell region and/or a range extension region. The picocell region formed by LP node 14 is illustrated using horizontal hatching. In the picocell region, both uplink and downlink signals to the picocell are strong. The range extension region includes device 12 served by both the macrocell 34 and picocell in which path loss to the picocell may be less than the path loss to macrocell 34. In particular, the path loss on the downlink to device 12 is larger from the picocell, whereas the path loss on the uplink to macrocell 34 or RRM apparatus 16 is larger. The range extension regions are illustrated using vertical hatching.

Different noise metrics may be employed in respective regions. For example, the second noise metric, i.e., SLNR, may be applied in the range extension regions 37, 39, 41, 43, 45, 47, 49 and/or 51 while the first noise metric, i.e., SINR, may be applied in picocell regions 36, 38, 40, 42, 44, 46, 48 and/or 50. Of note, picocell regions 36, 38, 40, 42, 44, 46, 48 and 50 may be formed using a LP node 14, as discussed above. Employing the second noise metric in the range extension region and the first noise metric in the picocell region helps minimize the interference to other devices, served by the picocell, and also helps minimize the interference to other devices, served by macrocell 34, from picocell coverage signals. The application of at least the first and/or second noise metrics within respective coverage regions is also discussed with respect to FIG. 9.

Figure 5:
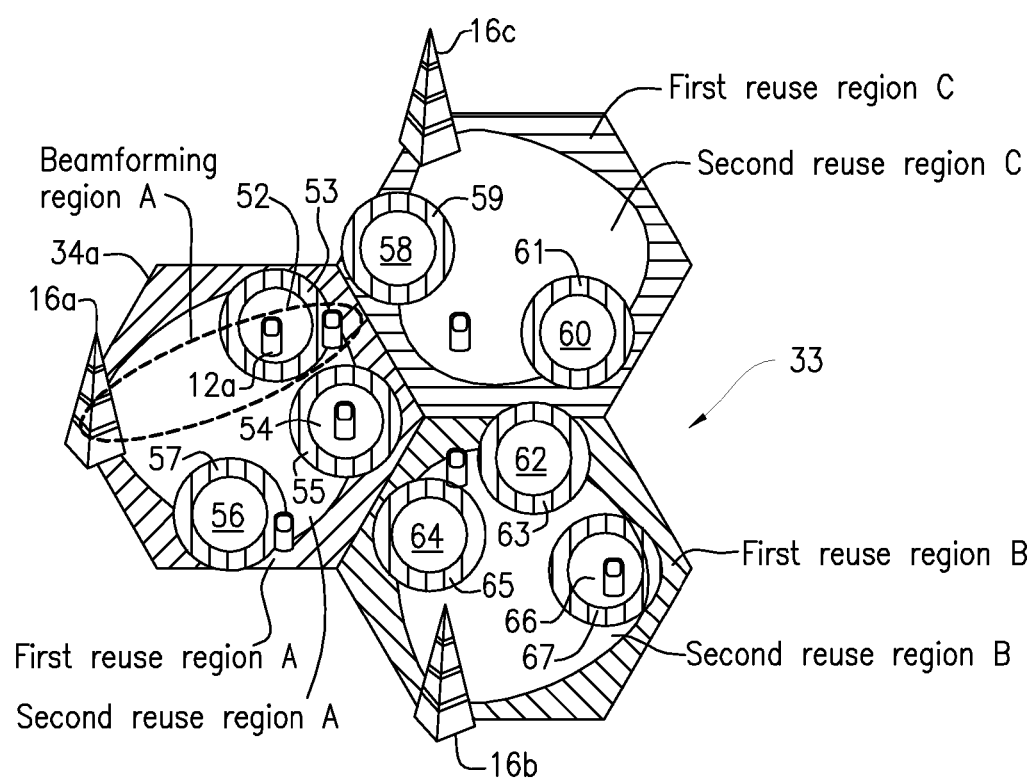
FIG. 5 is another block diagram of a communication system employing a second radio resource management optimization process constructed in accordance with the principles of the present invention.

An exemplary embodiment of a heterogeneous network is described with reference to FIG. 5. Macrocell 34 may substantially correspond to macrocell 34 discussed above with respect to FIG. 4 except that macrocell 34 may have one or more reuse regions and/or may employ targeted beamforming. First reuse regions A, B and C such as FFR regions are illustrated using diagonal and horizontal hatching in respective regions while range extension regions such as 55, 61 and 67 are illustrated using vertical hatching. As discussed above in FIG. 4, the signal strength of device 12 located within a picocell may be optimized using a first noise metric such as the SINR metric while the signal strength of device 12 located within the range extension region may be optimized using the SLNR metric. Other noise metrics may be used to optimize the signal strength of device 12 as discussed below.

Macrocell 34a may have a second reuse region A such as a common reuse region and a first reuse region such as a fractional frequency reuse region in which one or more picocells such as picocells 52,54 and/or 56 may overlap with the first and/or second reuse regions. The noise metric employed to optimize the signal strength of at least one user device 12 may be based at least in part on whether device 12 is located within a picocell region that overlaps the second region. For example, the signal strength of user devices 12 operating in the cell edge FFR region may be optimized using the second noise metric such as the SLNR metric. Using the second noise metric for devices 12 located within a picocell region that overlaps the first reuse region minimizes interference to other devices within the macrocell 34 and within neighboring macrocells 34. If device 12 is located within a picocell region that does not overlap the first reuse region, the signal strength of device 12 may be optimized using a first noise metric such as a SINR metric, as also discussed with respect to FIG. 9.

Macrocell 34 may include targeted beamforming in which the signal strength of device 12 within the beamforming region may be optimized using the first and second noise metrics. For example, the signal strength of devices 12 located within beamforming region A may be optimized using the second noise metric with respect to picocells that are not spatially orthogonal to beamforming region A. The signal strength of at least device 12a may be optimized using the SLNR metric with respect to picocells 52 and 58 because beamforming region A may leak into picocells 52 and 58. Continuing the example, the signal strength of device 12a may be optimized using the first noise metric with respect to other picocells that are spatially orthogonal to beamforming region A, i.e., the signal strength of at least device 12a may be optimized using the SINR metric with respect to the other picocells such as 54, 56, 60, 62, 64 and 66.

With respect to device 12 outside of the beam forming region and inside first region, if one or more picocells overlap the first region, the second metric such as the SLNR metric may be used to optimize the signal strength of device 12 such that the interference to devices 12 being served by picocells, both within the serving macrocell 34 and within neighboring macrocells 34, is minimized. Otherwise, the first noise metric such as the SINR metric may be used in the first region when picocells overlap the first region and device 12 is outside the beamforming region.

Figure 6:
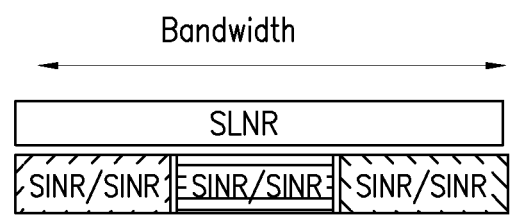
FIG. 6 is a noise metric to bandwidth mapping of the communication system illustrated in FIG. 5.

An exemplary noise metric to bandwidth mapping is illustrated in FIG. 6. In particular, the deployment illustrated in FIG. 5 may have a noise metric to bandwidth mapping based at least in part on the macrocell 34 configuration, e.g., reuse scheme employed. In particular, an SLNR metric may be employed in the common reuse region such that the entire bandwidth of the common reuse region is taken into account. A SINR or SLNR metric may be employed in the fractional reuse region in which the bandwidth allocated for use in the respective fractional reuse region is taken into account by the noise metric being employed. With reference to both FIGS. 5 and 6, similar hatchings illustrate the region/geometry to bandwidth mappings in which the corresponding noise metric(s) are also illustrated.

Figure 7:
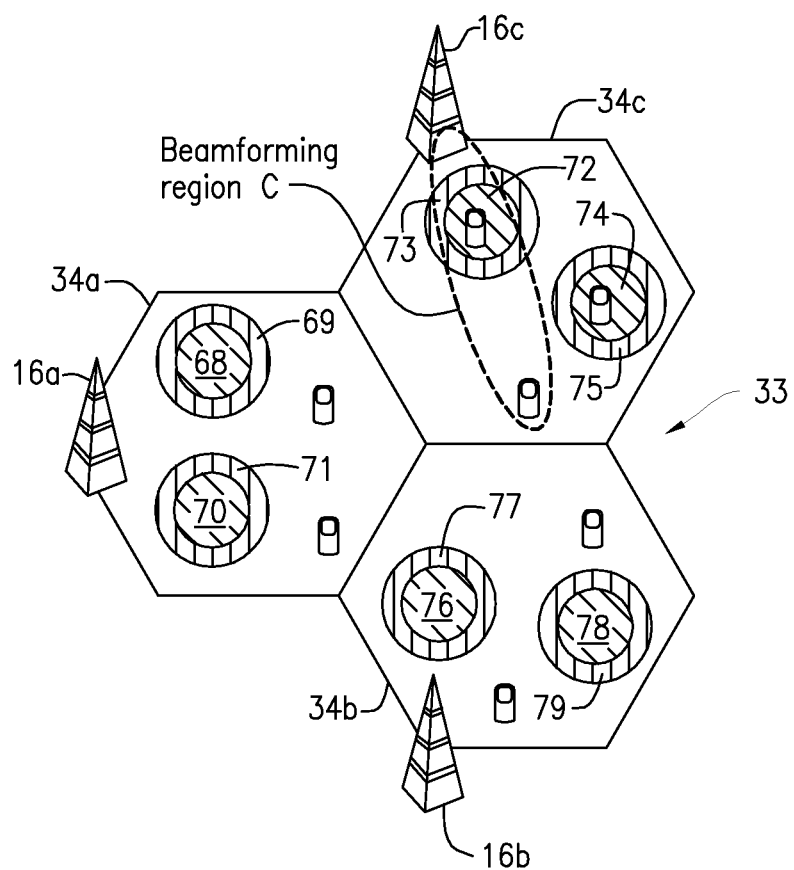
FIG. 7 is a block diagram of a communication system employing a third radio resource management optimization process constructed in accordance with the principles of the present invention.

With reference to FIG. 7, there is illustrated a heterogeneous network employing a shared cell arrangement. In the shared cell arrangement, macrocell 34 may include one or more picocells (illustrated using diagonal hatching) within its coverage area in which macrocell 34 and the one or more picocells have the same physical cell identities (PCI). For example, macrocell 34a may have the same PCI as picocells 68 and 70 while macrocell 34c may have the same PCI as picocell 72 and 74. The first noise metric such as the SINR metric may be employed to optimize signal strength for device 12 within the picocell coverage area. Employing the first metric within each picocell maximizes cell splitting. The second noise metric such as the SLNR metric may be employed for device 12 within the range extension region. Device 12 outside the picocell and range extension regions (illustrated using vertical hatching) may have its signal strength optimized by scheduling at least one SB to device 12 based at least in part on the SINR metric. The range extension region in the shared cell arrangement may refer to an extension region around the picocell that is defined by internal processing, from macrocell 34's or picocell's perspective, since, from device 12's perspective, signals are from the same cell regardless if device 12 is attached to macrocell 34 or picocell.

Macrocell 34 may include beamforming to target device 12 within macrocell 34. Beamforming allows the macrocell 34 to target device 12 within macrocell 34 that does not have coverage in the picocell region. At least one SB may be allocated to at least one device 12 based at least in part on the first and second noise metrics when the at least one device 12 located within the beamforming region. For example, the second noise metric such as the SLNR metric may be employed with respect to macrocell 34 coverage area to optimize the signal strength of device 12 within the beamforming region. Also, the first noise metric such as the SINR may be used with respect to the picocells to optimize the signal strength of device 12 within the beamforming region. The application of the first and/or second noise metrics within respective regions is described with respect to FIG. 10.

Figure 8:
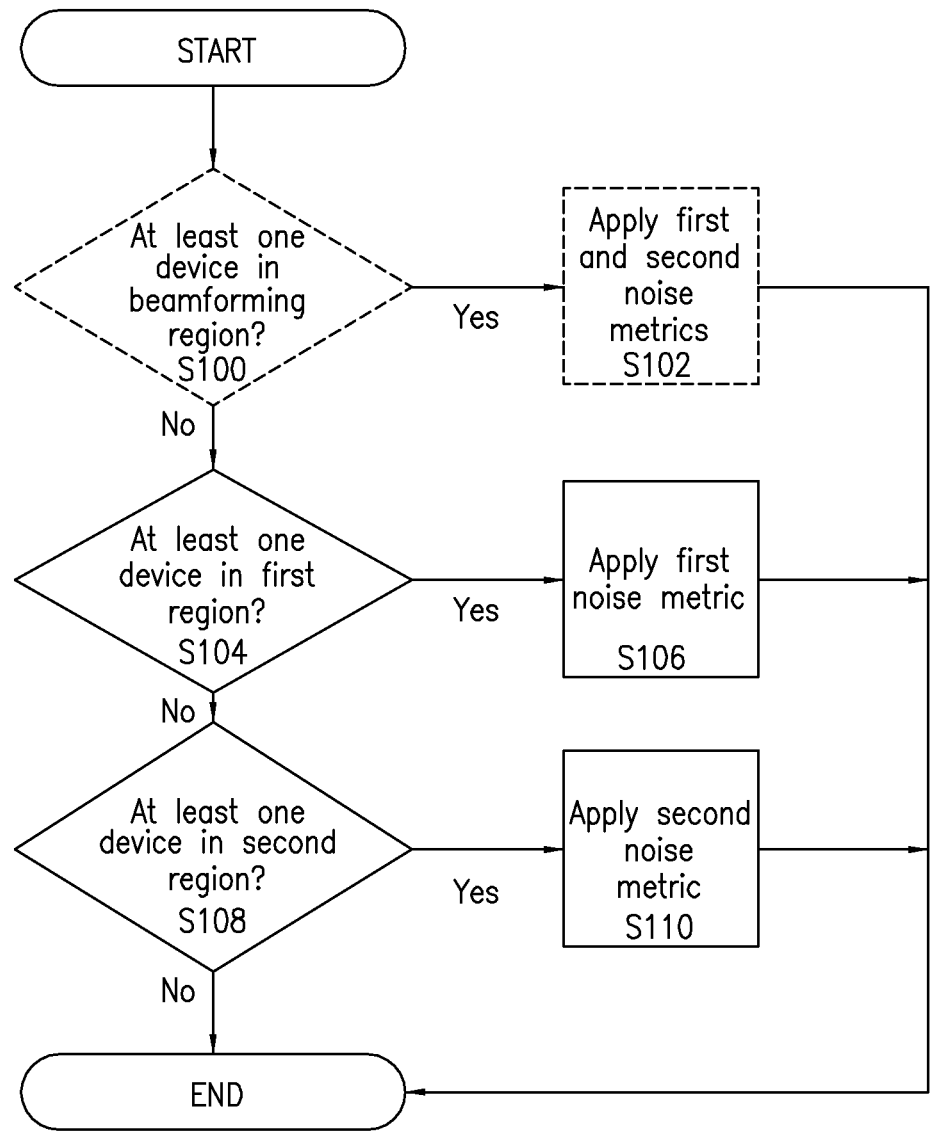
FIG. 8 is a flowchart of an exemplary first radio resource management optimization process in accordance with the principles of the present invention.

FIG. 8 illustrates an exemplary flowchart of the first RRM optimization process. Processor 24 determines whether device 12 is located within a beamforming region (Block S100). If device 12 is located within the beamforming region, first and second noise metrics are applied to determine at least one SB for use by device 12, as also discussed above with respect to FIG. 2 (Block S102). In other words, device 12, located within the beamforming region, is allocated at least one SB based at least in part on the first and second noise metrics. Alternatively, Blocks S100 and S102 may be skipped if the macrocell does not employ targeted beamforming, i.e., the process may begin at Block S104. If the determination is made that device 12 is located outside the beamforming region, processor 24 determines whether device 12 is located within a first region (Block S104). For example, processor 24 determines whether device 12 is located within the fractional frequency reuse region of macrocell 34.

If the determination is made that device 12 is located within the first region, the first noise metric such as the SINR metric is applied to determine, in part, at least one SB to allocate device 12 (Block S106). If the determination is made that device 12 is outside of the first region, processor 24 determines whether device 12 is located within the second region (Block S108). At least one SB may be determined for use by device 12 based at least in part on the second noise metric such as SLNR when device 12 is determined to be positioned within the second reuse region (Block S110). If processor 24 determines that device 12 is not located within the second region, the first RRM optimization process may end. Alternatively, the determination of Block S108 may be skipped and at least one SB may be determined for use by device 12 based at least in part on the second metric such as the SLNR metric, i.e., device 12 is by default in the second region given the network deployment illustrated in FIG. 2. As yet another alternative, the determination of Block S108 may be skipped and at least one SB may be determined for use by device 12 based at least in part on the first metric such as the SINR metric. Blocks S100, S104 and/or S108 may be performed in a different order depending on design need.

Figure 9:
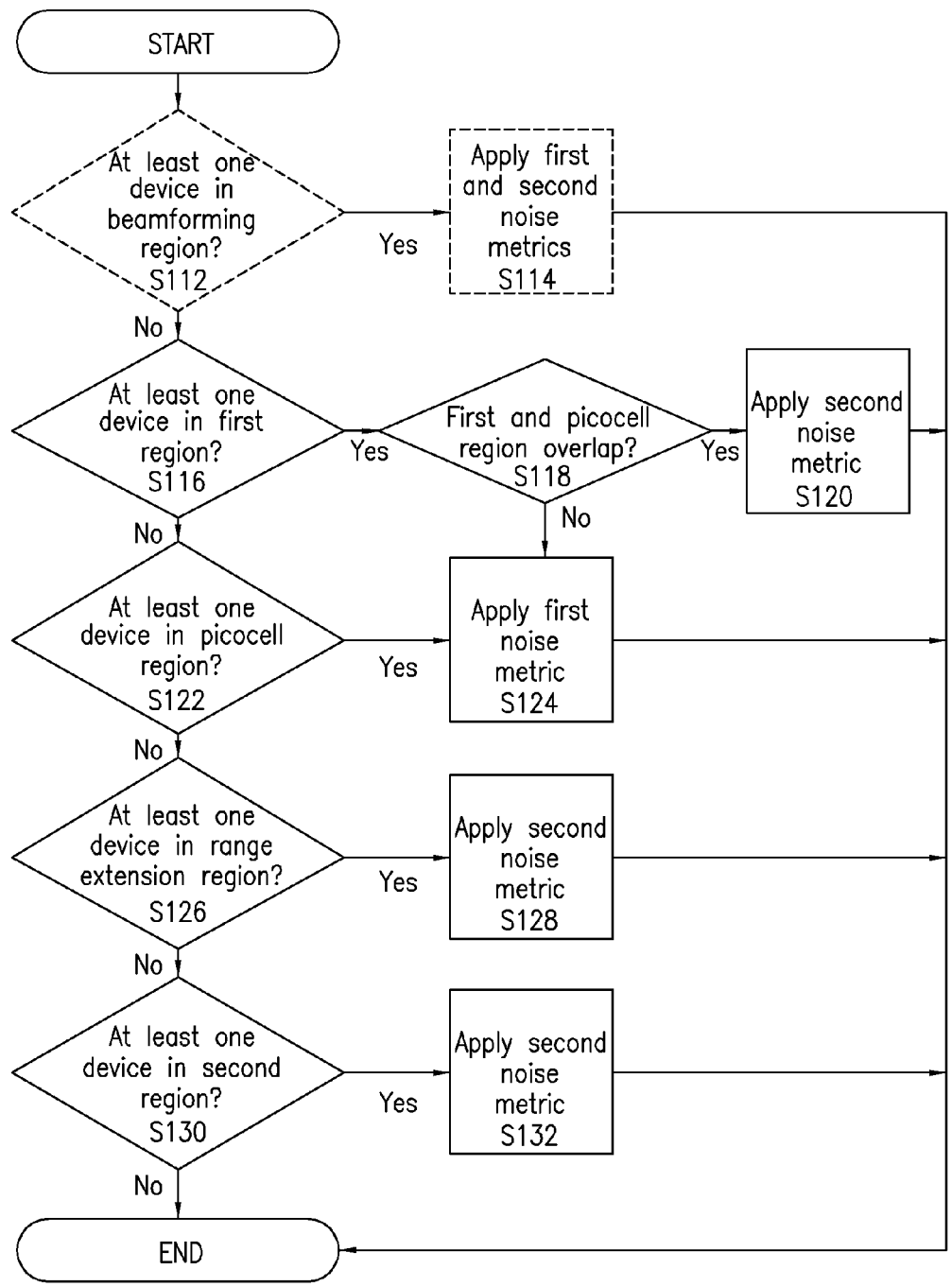
FIG. 9 is a flowchart of an exemplary second radio resource management optimization process in accordance with the principles of the present invention.

An exemplary second RRM optimization process is described with reference to FIG. 9. Processor 24 determines whether device 12 is located within a beamforming region, e.g., beamforming region A (Block S112). If device 12 is determined to be within the beamforming region, at least first and second noise metrics are determine at least one SB for use by device 12, i.e., SINR and SLNR noise metrics are employed as discussed above with respect to FIGS. 4-5 (Block S114). Alternatively, Blocks S112 and S114 may be skipped if macrocell 34 does not employ targeted beamforming, i.e., the process may begin at Block S116. If the determination is made that device 12 is outside the beamforming region, processor 24 determines whether device 12 is within the first region such as first reuse region (Block S116). If device 12 is determined to be within the first region, processor 24 determines whether the first region overlaps a picocell region (Block S118). For example, one or more picocells may be deployed near the cell edge of macrocell 34 such that at least one picocell overlaps the FFR region. If the determination is made that the first region overlaps within the picocell region, at least one SB for use by device 12 is determined or scheduled based at least in part on the second noise metric (i.e., SLNR metric) such that the signal strength of device 12 is optimized (Block S120).

If the determination is made that the picocell region does not overlap with the first region, device 12 is scheduled at least one SB based at least in part on the first noise or SINR metric (Block S124). If processor 24 determines device 12 is not within the first region, a determination is made whether device 12 is located within the picocell region (Block S122). If device 12 is determined to be within the picocell region, the first noise metric may be employed to determine, in part, at least one SB for use by device 12. If processor 24 determines device 12 is outside the picocell region, a determination is made as to whether device 12 is within a range extension region (Block S126). If processor 24 determines device 12 is within the range extension region, at least one SB may be determined for use by device 12 based at least in part on the second noise metric such that the signal strength of device 12 is optimized. If the determination is made that device 12 is not within a range extension region within macrocell 34, processor 24 determines whether device 12 is located or positioned within the second region (Block S130). Device 12 may be scheduled at least one SB based at least in part on the second noise metric if device 12 is determined to be within the second region of macrocell 34 (Block S132). If the determination is made that device 12 is located outside the second region, the second RRM optimization process ends. Alternatively, the determination of Block S130 may be skipped and at least one SB may be scheduled to device 12 based at least in part on the second metric if the device 12 is outside the range extension region, i.e., device 12 is by default in the second region given the network deployment illustrated in FIG. 4-5.

Figure 10:
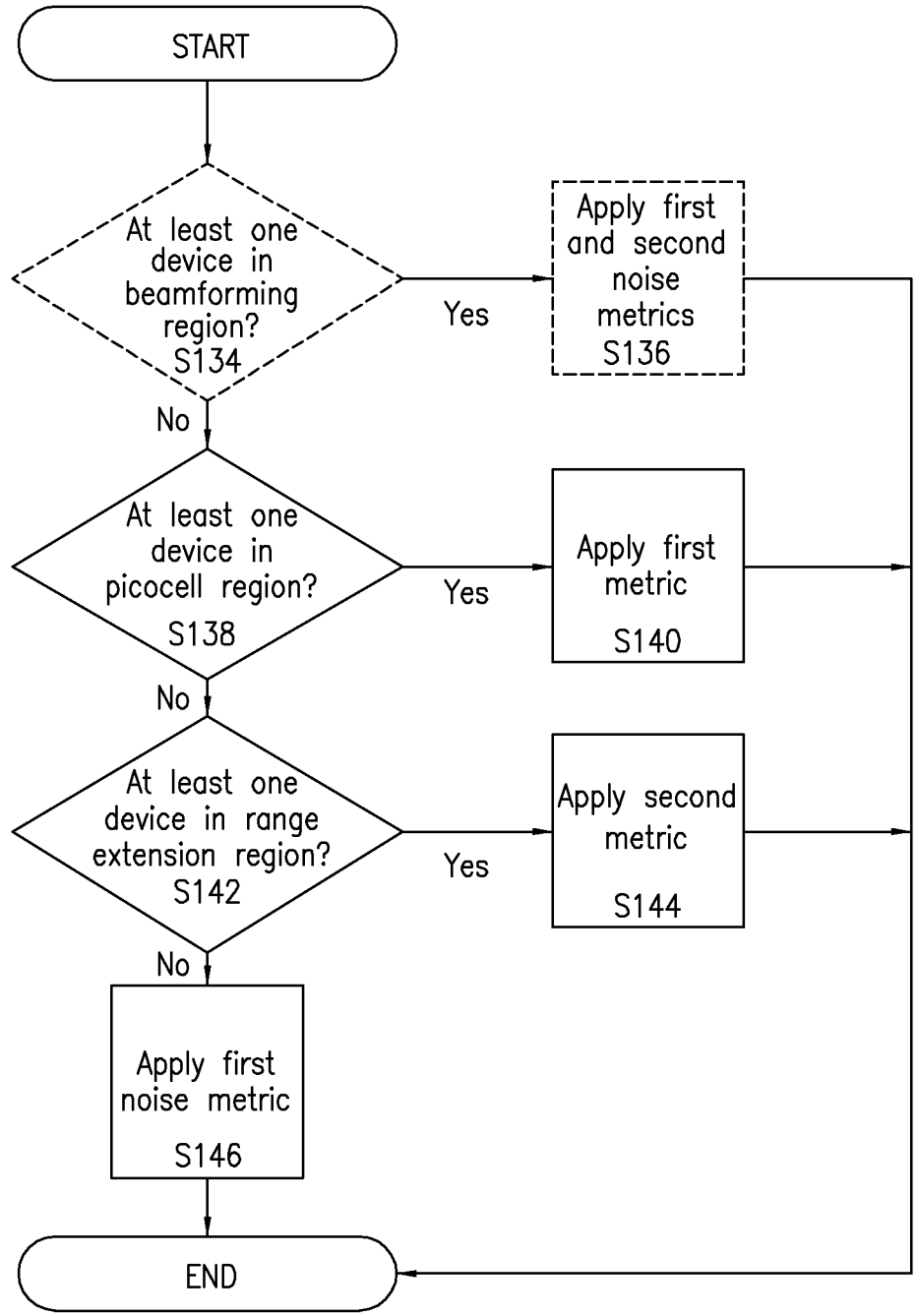
FIG. 10 is a flowchart of an exemplary third radio resource management optimization process in accordance with the principles of the present invention.

An exemplary third RRM optimization process is described with reference to FIG. 10. Processor 24 determines whether device 12 is located within a beamforming region, e.g., beamforming region C (Block S134). If the determination is made that device 12 is located within the beamforming region, at least one SB is determined for use by device 12 based at least in part on the SINR and SLNR noise metrics, i.e., the signal strength of device 12 is optimized based at least in part on the first and second noise metrics as disclosed with respect to FIG. 7 (Block S136). If the determination is made that device 12 is located outside the beamforming region, processor 24 determines whether device 12 is located within a picocell region (Block S138). At least one SB may be determined for use by device 12 based at least in part on the first noise metric if device 12 is determined to be within the picocell region (Block S140). If processor 24 determines device 12 is outside the picocell region, a determination is made as to whether device 12 is within a range extension region (Block S142). If device 12 is determined to be within the range extension region, a second noise metric is applied, i.e., device 12 is allocated at least one SB based at least in part on the SLNR metric (Block S144). If the determination is made that device 12 is located outside the range extension region and within the macrocell 34, processor 24 may determine at least one SB to schedule device 12 based at least in part on the first noise metric, i.e., based at least in part on the SINR metric. It is contemplated that Blocks S134, S138, S142 and S146 may be performed in a different order than shown in FIG. 10 based on design need.

The invention provides a methodology to align one or more noise metrics for signal strength optimization based on the spatial or frequency orthogonality of coverage regions to minimize interference leakage between coverage regions that are not orthogonal while allowing maximization of at least one noise metric in coverage regions that are spatially orthogonal or in the frequency domain. In other words, the instant invention provides a mapping of SINR and/or SLNR interference optimization to the geometry of the network and frequency reuse implementation that achieves a minimum interference geometry for a given network deployment.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A radio resource management, RRM, apparatus for at least one wireless communication network macrocell, the macrocell having at least first coverage region and second coverage region, the RRM apparatus comprising:
   a processor, the processor being configured to:
   determine at least one scheduling block, SB, for use by at least one user device;
   the determination of the at least one SB being based at least in part on a first noise metric when the at least one user device is located within the first coverage region; and
   the determination of the at least one SB being based at least in part on a second noise metric different from the first noise metric when the at least one user device is located within the second coverage region.

2. The RRM apparatus of claim 1, wherein the first noise metric a signal to interference plus noise ratio, SINR, metric and the second noise metric is a signal leakage to noise ratio, SLNR, metric.

3. The RRM apparatus of claim 2, wherein the first coverage region is a fractional frequency reuse region and the second coverage region is a common frequency reuse region.

4. The RRM apparatus of claim 1, wherein the wireless communication network macrocell includes a third coverage region defined at least in part by beamforming; and
   the determination of the at least one SB being based at least in part on the first and second noise metrics when the at least one user device is located within the third coverage region.

5. The RRM apparatus of claim 1, wherein the first coverage region is a picocell coverage region and the second coverage region is an extended range coverage region.

6. The RRM apparatus of claim 5, wherein the macrocell further includes:
   a third coverage region, the third coverage region being a fractional frequency reuse region;
   a fourth coverage region, the fourth coverage region being a common frequency reuse region; and
   the determination of the at least one SB being based at least in part on the second noise metric when the at least one user device is located within the third coverage region and when the third coverage region does not overlap with the first coverage region; and
   the determination of the at least one SB being based at least in part on the first noise metric when the at least one user device is located within the third coverage region, and when the third coverage region overlaps with the first coverage region.

7. The RRM apparatus of claim 5, wherein the macrocell further includes:
   a third coverage region, the third coverage region is a fractional frequency reuse region;
   a fourth coverage region, the fourth coverage region is a common reuse region;
   a fifth coverage region, the fifth coverage region is defined at least in part by beamforming; and the determination of the at least one SB being based at least in part on the first and second noise metrics when the at least one user device is located within the fifth coverage region; and the determination of the at least one SB being based at least in part on the second metric noise metric when the at least one user device is located within third coverage region and when the third coverage region overlaps with the first coverage region.

8. The RRM apparatus of claim 7, wherein when the at least one user device is located within the fifth coverage region, the first noise metric is applied with respect to other user devices in picocell regions that do not overlap the fifth coverage region and the second noise ratio metric is applied with respect to other user devices in picocell regions that overlap the fifth coverage region.

9. The RRM apparatus of claim 5, wherein the macrocell further includes a third coverage region defined at least in part by beamforming; and the determination of the at least one SB being based at least in part on the first and second noise metrics when the at least one user device is located within the third coverage region.

10. The RRM apparatus of claim 9, wherein when the at least one user device is located within the third coverage region, the first noise metric is applied with respect user devices in other picocells within the macrocell and the second noise metric is applied with respect to user devices in the macrocell.

11. The RRM apparatus of claim 10, wherein the macrocell has a physical cell identity, PCI, and the other picocells have the same PCI as the macrocell.

12. The RRM apparatus of claim 11, wherein the macrocell further includes a fourth coverage region that overlaps at least in part the first, second and third coverage regions; and the determination of the at least one SB being based at least in part on the first noise metric when the at least one user device is located within the fourth coverage region and outside first, second and third coverage regions.

13. A radio resource management, RRM, method for at least one wireless communication network macrocell, the macrocell having at least a first coverage region and second coverage region, the RRM method comprising:

determining at least one scheduling block, SB, for use by at least one user device;

the determination of the at least one SB being based at least in part on a first noise metric when the at least one user device is located within the first coverage region; and the determination of the at least one SB being based at least in part on a second noise metric different from the first noise metric when the at least one user device is located within the second coverage region.

14. The RRM method of claim 13, wherein the first noise metric a signal to interference plus noise ratio, SINR, metric and the second noise metric is a signal leakage to noise ratio, SLNR, metric.

15. The RRM method of claim 14, wherein the first coverage region is a fractional frequency reuse region and the second coverage region is a common frequency reuse region.

16. The RRM method of claim 13, wherein the wireless communication network macrocell includes a third coverage region defined at least in part by beamforming; and the determination of the at least one SB being based at least in part on the first and second noise metrics when the at least one user device is located within the third coverage region.

17. The RRM method of claim 13, wherein the first coverage region is a picocell coverage region and the second coverage region is an extended range coverage region.

18. The RRM method of claim 17, wherein the macrocell further includes:

a third coverage region, the third coverage region being a fractional frequency reuse region;

a fourth coverage region, the fourth coverage region being a common frequency reuse region; and the determination of the at least one SB being based at least in part on the second noise metric when the at least one user device is located within the third coverage region and when the third coverage region does not overlap with the first coverage region; and the determination of the at least one SB being based at least in part on the first noise metric when the at least one user device is located within the third coverage region and when the third coverage region overlaps with the first coverage region.

19. The RRM method of claim 17, wherein the macrocell further includes:

a third coverage region, the third coverage region is a fractional frequency reuse region;

a fourth coverage region, the fourth coverage region is a common reuse region;

a fifth coverage region, the fifth coverage region is defined at least in part by beamforming; and the determination of the at least one SB being based at least in part on the first and second noise metrics when the at least one user device is located within the fifth coverage region; and the determination of the at least one SB being based at least in part on the second metric noise metric when the at least one user device is located within the third coverage region and when the third coverage region overlaps with the first coverage region.

20. The RRM method of claim 19, wherein when the at least one user device is located within the fifth coverage region, the first noise metric is applied with respect to other user devices in picocell regions that do not overlap the fifth coverage region and the second noise ratio metric is applied with respect to other user devices in picocell regions that overlap the fifth coverage region.

21. The RRM method of claim 17, wherein the macrocell further includes a third coverage region defined at least in part by beamforming; and the determination of the at least one SB being based at least in part on the first and second noise metrics when the at least one user device is located within the third coverage region.

22. The RRM method of claim 21, wherein when the at least one user device is located within the third coverage region, the first noise metric is applied with respect user devices in other picocells within the macrocell and the second noise metric is applied with respect to user devices in the macrocell.

23. The RRM method of claim 22, wherein the macrocell has a physical cell identity, PCI, and the other picocells have the same PCI as the macrocell.

24. The RRM method of claim 23, wherein the macrocell further includes a fourth coverage region that overlaps at least in part the first, second and third coverage regions; and the determination of the at least one PRB being based at least in part on the first noise metric when the at least one user device is located within the fourth coverage region and outside the first, second and third coverage regions.

* * * * *